US006743094B2

(12) United States Patent
Johnson

(10) Patent No.: US 6,743,094 B2
(45) Date of Patent: Jun. 1, 2004

(54) TABLE BONUS GAME

(75) Inventor: Bradley W. Johnson, Henderson, NV (US)

(73) Assignee: Paltronics, Inc., Las Vegas, NV (US)

( * ) Notice: Subject to any disclaimer, the term of this patent is extended or adjusted under 35 U.S.C. 154(b) by 61 days.

(21) Appl. No.: 09/957,998

(22) Filed: Sep. 21, 2001

(65) Prior Publication Data

US 2002/0037765 A1 Mar. 28, 2002

Related U.S. Application Data

(60) Provisional application No. 60/234,349, filed on Sep. 22, 2000.

(51) Int. Cl.[7] .......................... A63F 13/00; A63F 9/24; G06F 17/00; G06F 19/00

(52) U.S. Cl. ............................ 463/17; 463/12; 463/20; 463/13; 273/309

(58) Field of Search ............................ 463/1–9, 11–20, 463/40–42; 273/142 E, 142 F, 142 G

(56) References Cited

U.S. PATENT DOCUMENTS

| | | | | | |
|---|---|---|---|---|---|
| 4,339,798 | A | | 7/1982 | Hedges et al. | |
| 4,467,424 | A | | 8/1984 | Hedges et al. | |
| 4,643,425 | A | * | 2/1987 | Herzenberger | 463/17 |
| 4,856,787 | A | | 8/1989 | Itkis | |
| 4,926,327 | A | | 5/1990 | Sidley | |
| 5,116,055 | A | | 5/1992 | Tracy | |
| 5,249,800 | A | | 10/1993 | Hilgendorf et al. | |
| 5,280,909 | A | | 1/1994 | Tracy | |
| 5,288,077 | A | | 2/1994 | Jones | |
| 5,377,973 | A | | 1/1995 | Jones et al. | |
| 5,382,025 | A | | 1/1995 | Sklansky et al. | |
| 5,417,430 | A | | 5/1995 | Breeding | |
| 5,472,194 | A | | 12/1995 | Breeding et al. | |
| 5,611,730 | A | | 3/1997 | Weiss | |
| 5,707,285 | A | | 1/1998 | Place et al. | |
| 5,741,183 | A | | 4/1998 | Acres et al. | |
| 5,743,800 | A | | 4/1998 | Huard et al. | |
| 5,762,552 | A | | 6/1998 | Voung et al. | |
| 5,788,573 | A | | 8/1998 | Baerlocher et al. | |
| 5,794,964 | A | | 8/1998 | Jones et al. | |
| 5,795,225 | A | | 8/1998 | Jones et al. | |
| 5,830,069 | A | | 11/1998 | Soltesz et al. | |
| 5,848,932 | A | | 12/1998 | Adama | |
| 5,876,284 | A | | 3/1999 | Acres et al. | |
| 5,882,261 | A | | 3/1999 | Adams | |
| 5,911,418 | A | | 6/1999 | Adams | |
| 5,911,626 | A | | 6/1999 | McCrea, Jr. | |
| 5,913,726 | A | | 6/1999 | Jones et al. | |
| 5,934,999 | A | * | 8/1999 | Valdez | 463/17 |
| 5,941,773 | A | | 8/1999 | Harlick | |
| 5,951,011 | A | | 9/1999 | Potter et al. | |
| 6,004,207 | A | | 12/1999 | Wilson, Jr. et al. | |
| 6,012,982 | A | | 1/2000 | Piechowiak et al. | |
| 6,015,347 | A | | 1/2000 | Maahs et al. | |
| 6,024,642 | A | | 2/2000 | Stupak | |
| 6,080,063 | A | | 6/2000 | Khosla | |
| 6,083,105 | A | * | 7/2000 | Ronin et al. | 463/17 |
| 6,210,275 | B1 | | 4/2001 | Olsen | |
| 6,217,448 | B1 | | 4/2001 | Olsen | |
| 6,224,484 | B1 | | 5/2001 | Okuda et al. | |
| 6,267,669 | B1 | * | 7/2001 | Luciano et al. | 463/7 |
| 6,302,395 | B1 | * | 10/2001 | Astaneha | 273/274 |
| 6,336,857 | B1 | | 1/2002 | McBride | |
| 6,346,044 | B1 | | 2/2002 | McCrea, Jr. | |
| 6,379,247 | B1 | | 4/2002 | Walker et al. | |
| 6,485,368 | B2 | | 11/2002 | Jones et al. | |

* cited by examiner

*Primary Examiner*—Teresa Walberg
*Assistant Examiner*—Robert Mendoza
(74) *Attorney, Agent, or Firm*—Ryan A. Heck; Ian F. Burns & Assoc.

(57) ABSTRACT

A game and gaming device for playing a game by a game player. The game includes a table having a card betting layout located on a surface of the table. A roulette like betting layout is also located on the surface of the table. A roulette wheel is mounted to above the table facing the game player. The game allows wagering on and playing a card game and a roulette like game at the same time.

28 Claims, 8 Drawing Sheets

TABLE BONUS GAME

CROSS REFERENCE TO RELATED APPLICATIONS

This application claims priority of U.S. provisional patent application No. 60/234,349, filed on Sep. 22, 2000.

BACKGROUND OF THE INVENTION

1. Field of Invention

The present invention relates to a gaming device that allows a player to play a second or bonus game along with a regular table game such as blackjack or poker.

2. Description of Related Art

Table Games

Gaming devices are well known in the art and a large variety of gaming devices have been developed. A popular table game is the card game known as blackjack. A blackjack player plays against a dealer and the object is to beat the dealer. The player wins if the Dealer "Busts" or by receiving a cumulative point card total higher than the dealer without exceeding 21. The game of blackjack can be boring when played for an extended period of time. For example, many blackjack players who are used to playing video games find the pace of blackjack to be too slow and need more excitement in a game. Because of the small percentage difference in the odds of playing blackjack against a dealer, the same gaming chips are often passed between the blackjack player and the dealer which leads to increased boredom of the game player.

Another popular table game is the card game known as poker. A poker player plays against a dealer and the object is to beat the dealer. The player wins if the players card hand has a cumulative point card total higher than the dealers. The game of poker can also be boring when played for an extended period of time. For example, the game of poker can become repetitious because of relatively low value cards being frequently dealt to the game player.

Gaming players have desired games that are more exciting and stimulating. Gaming players have increasingly wanted to be able to have additional betting opportunities provided to them during a game. Many players desire to have several bets or games going at the same time so that if one game fails to win then they may win on another game.

A difficulty of adding additional betting opportunities to a table game is that they must be provided in a manner that does not confuse the game player and that does not unduly slow down the underlying game.

A current unmet need exists for a new table bonus game, gaming device and method that allows for increased player excitement and enthusiasm to enhance the players gaming experience while at the same time not being confusing or slowing down play. Another long felt need is for a gaming device that adds to player satisfaction and enjoyment leading to longer playing times.

SUMMARY OF INVENTION

1. Advantages of the Invention

One of the advantages of the present invention is that it provides a gaming device that adds to player satisfaction and excitement.

An additional advantage of the present invention is that it provides a gaming device that allows a game player to have several bets or games going at the same time.

An advantage of the present invention is that it provides a game that allows additional betting opportunities.

A further advantage of the present invention is that it provides a gaming device that allows a game player to play blackjack and a roulette like game at the same time.

Another advantage of the present invention is that it provides a gaming device that allows a game player to play poker and a roulette like game at the same time.

Another advantage of the present invention is that it provides a gaming device that allows a roulette wheel to be added to a gaming table.

A further advantage of the present invention is that it provides a gaming device that is attractive and entertaining to a game player.

These and other advantages of the present invention may be realized by reference to other portions of the specification, claims, and abstract.

2. Brief Description of the Invention

The present invention comprises a game. The game includes a table having a card betting layout located on a surface of the table. A roulette betting layout is located on the surface of the table. A roulette wheel is mounted to the table. The game allows wagering and playing a card game and a roulette game at the same time.

The above description sets forth, rather broadly, the more important features of the present invention so that the detailed description of the preferred embodiment that follows may be better understood and contributions of the present invention to the art may be better appreciated. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

Preferred embodiments of the present invention are shown in the accompanying drawings wherein.

DESCRIPTION OF THE PREFERRED EMBODIMENT

Table Gaming Device

Figure 1:
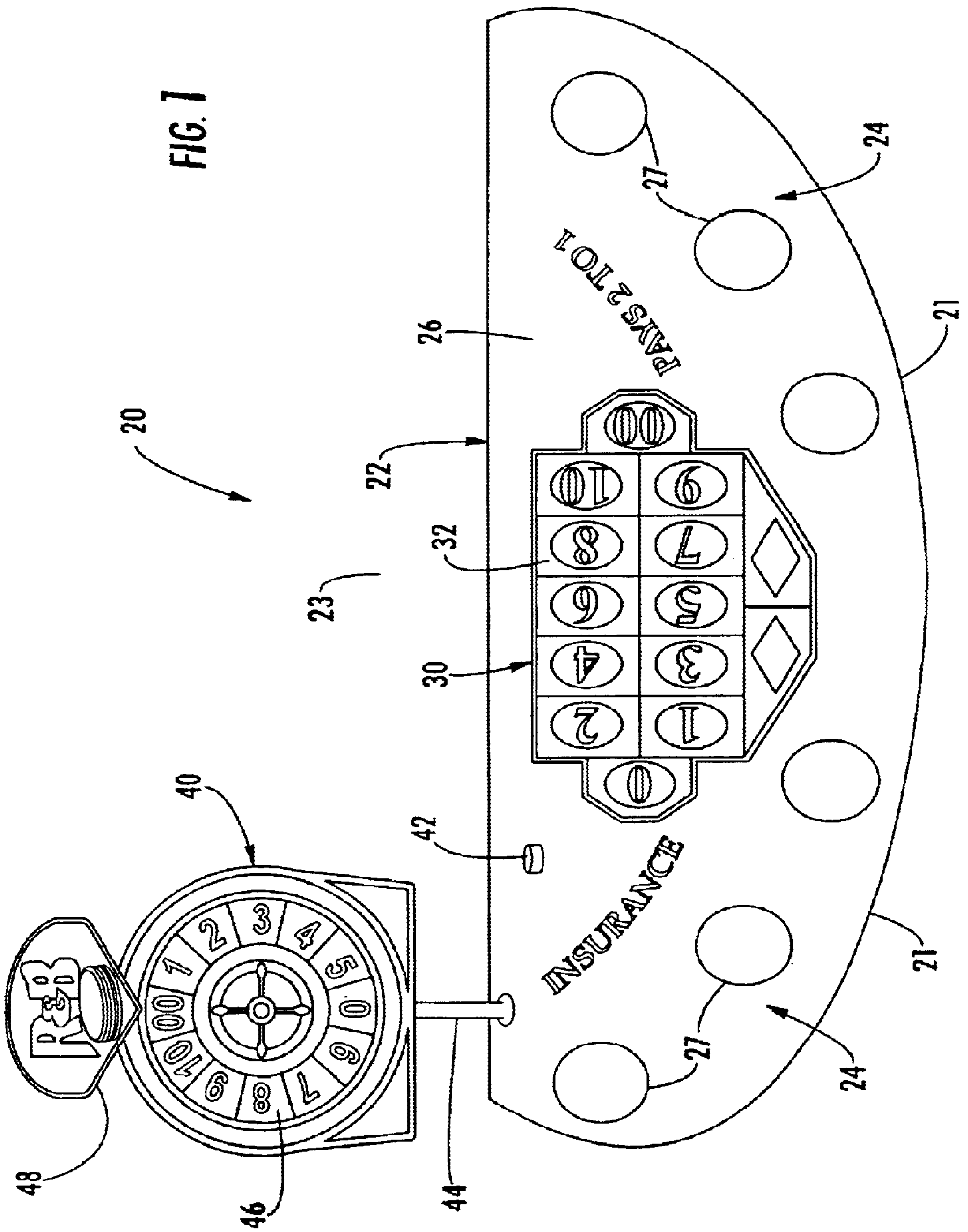
FIG. 1 is substantially a front perspective view of the gaming device of the present invention.

As seen in FIG. 1, the present invention comprises a gaming device, generally indicated by reference number 20. Gaming device 20 comprises a table 22, top surface 26, card wagering area 24, roulette like wagering area 30 and roulette wheel 40. A button 42 is provided for activating the roulette wheel.

Gaming device 20 has a planar table 22 that would typically be covered with a felt material. Table 22 is constructed to allow several game players to be seated at player positions generally indicated by reference number 21. A dealer is located behind table 22 opposite the game players. The dealer is located in a dealer position 23. Table 22 has a card wagering area 24 located on top surface 26. Card wagering area 24 has several individual card wagering positions Card wagering area 24 is shown as a conventional blackjack card wagering layout. Wagering area 24 could also be other card gaming layouts such as poker.

Table 22 has a number field or roulette like wagering area 30 located on top surface 26. Roulette wagering area 30 has 12 roulette wagering positions 32 with indicia numbered 00 and 0–10. Roulette wagering area 30 is slightly different than a conventional roulette wagering area in that there are fewer betting possibilities.

Figure 8:
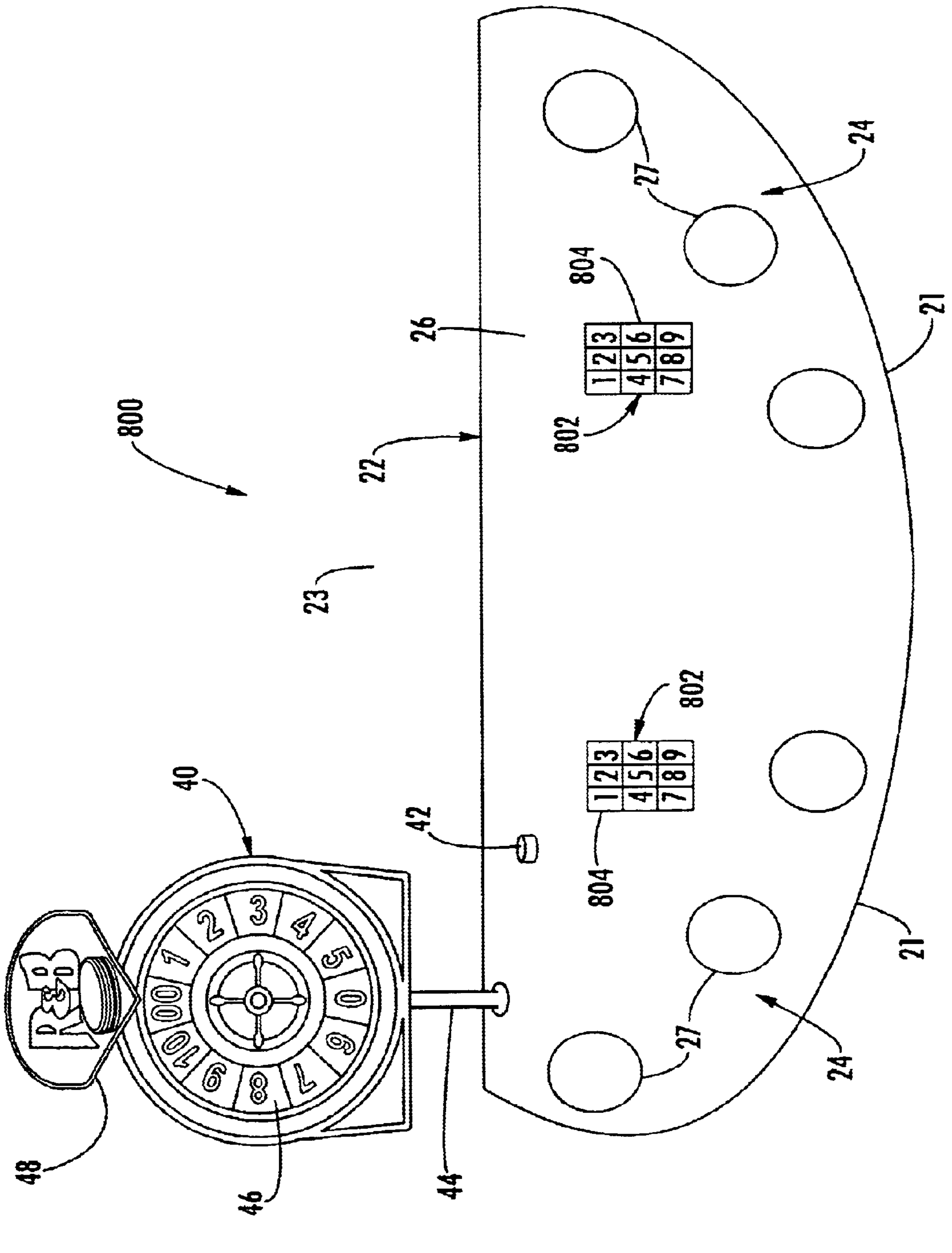
FIG. 8 is substantially a front perspective view of the gaming device of the present invention using a keypad.

Alternatively, a keypad 802 or liquid crystal display (LCD) display as shown in FIG. 8, can be placed adjacent to card wagering areas 24 in order to place a roulette bet instead of using wagering area 30. If keypad 802 is used then wagering area 30 is removed from table 22. Gaming device 800 uses keypad 802. Keypad 802 has selector buttons 204 that allow the game players to select a roulette number. Keypad 802 may be connected to another display (not shown) to indicate each players bet.

Figure 2:
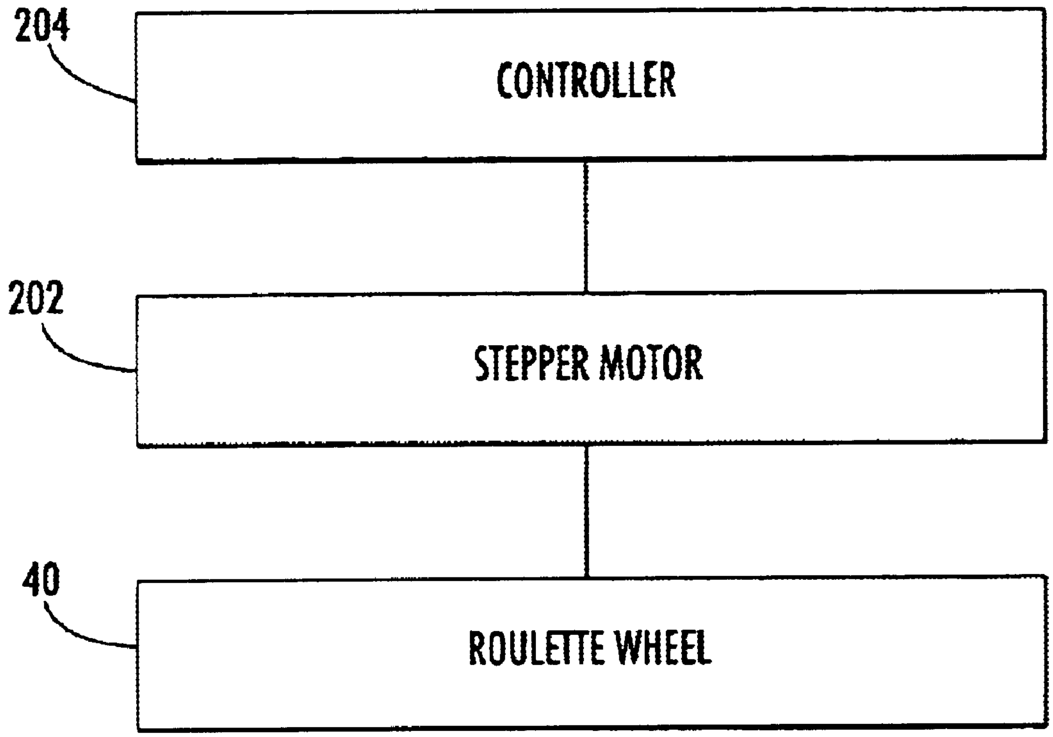
FIG. 2 is substantially a schematic diagram of the gaming device of FIG. 1.

A roulette wheel 40 is mounted on a pole 44 above table 22. Pole 44 is mounted to table 22. The roulette wheel 40 is positioned so that it is visible to the game players in player positions 21. Roulette wheel 40 is circular in shape and is divided into 12 regions 46. Each region 46 contains indicia that correspond to the indicia in roulette wagering positions 32. A wheel pointer 48 is mounted to roulette wheel 40. Wheel pointer 48 indicates the winning roulette number 48 after the roulette wheel has stopped spinning. Turning to FIG. 2, roulette wheel 40 is a conventional roulette wheel that is driven by a stepper motor 202 that is controlled by a processor or controller 204. The controller has software that is designed to activate, spin and randomly stop the spinning roulette wheel 40 in conjunction with a random number generator corresponding to a pay table. The controller also can initiate sound and light sequences around the roulette wheel and collect game statistics. Controller 204 would be located under table 22 in a secure cabinet (not shown).

During game play, a game player would be seated in player position 21. A dealer in dealer position 23 deals cards for a conventional card game such as blackjack or poker. The game player has the option of playing the card game by placing a card game wager on card wagering area 24. In addition, the game player has the option of playing a roulette like game by placing a roulette wager on roulette wagering area 30 or on keypad 802 in the middle of table 22. The numbers of area 30 correspond to the numbers on roulette wheel 40 as do the numbers on keypad 802. Those players desiring to play the card game are dealt a hand of cards and the card game is played to its normal conclusion. The dealer collects or pays the card game bets along with collecting the cards. After the card game is completed, the dealer pushes button 42 to start the roulette wheel 40 spinning. The wheel stops on a winning roulette number indicated by wheel pointer 48. The dealer then collects or pays the roulette bets. A new game may now be played.

It is noted that gaming device 20 may be used with many different types of games and with many different types of card games in particular. For example, gaming device 20 can be used with poker and blackjack. The roulette like game and the card game are two separate independent games. The outcome of one of the games does not influence the outcome of the other game.

The game is designed so that the game player has the option of playing a card game, a roulette game or both. One or both of the games could be made mandatory for a game player to play during the game.

The game was shown using an additional game of roulette. Other games could be used for example, a lottery game, a keno game, a bingo game or almost any other game.

Video Display Embodiment

Figure 3:
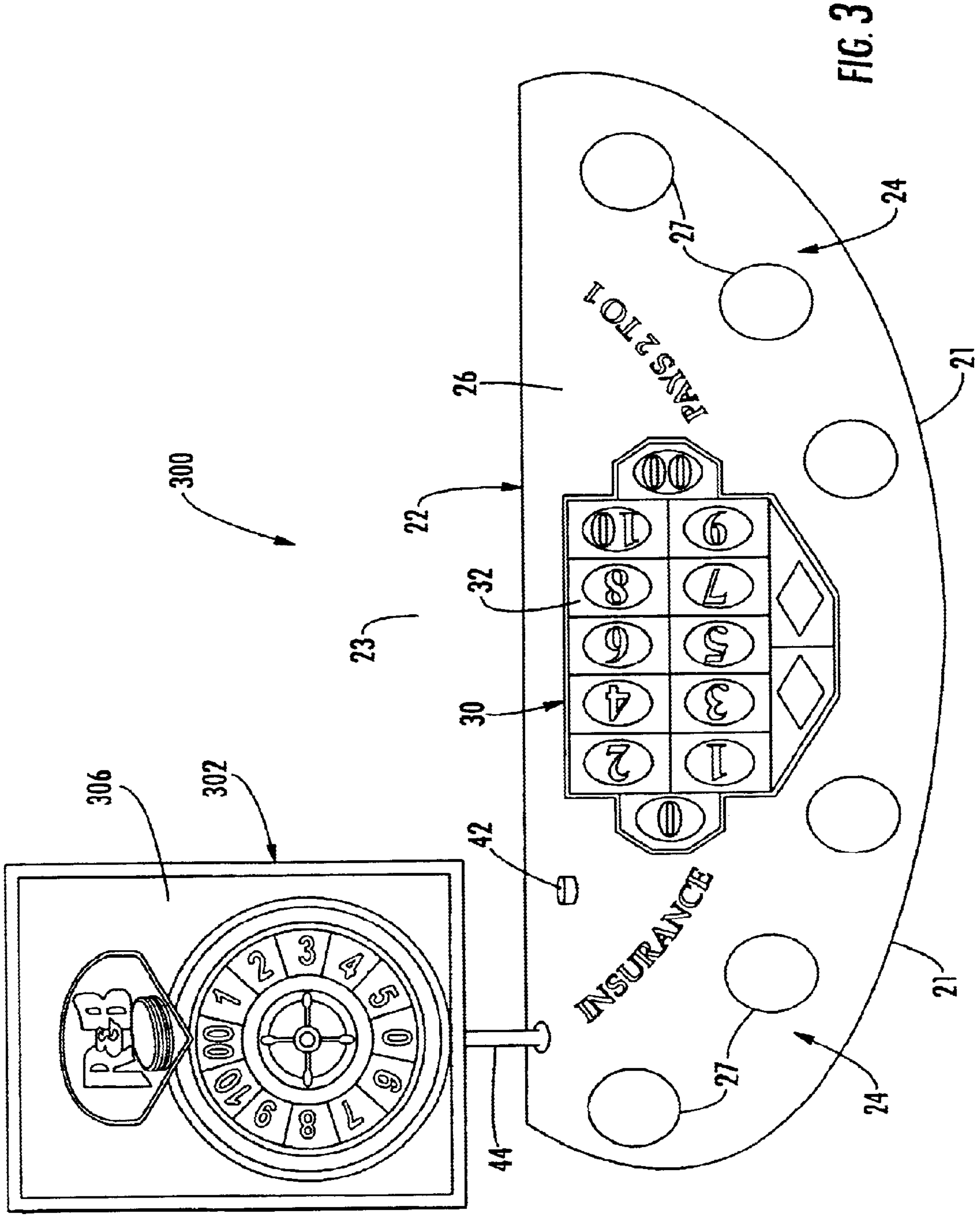
FIG. 3 is substantially a front perspective view of the gaming device of the present invention utilizing a video display.

Referring to FIG. 3, a gaming device 300 is shown. Gaming device 300 is similar to gaming device 20 except that roulette wheel 40 has been replaced by a video display 302. Video display 302 presents an image 306 of the roulette wheel and wheel pointer that is shown to the player. Video display 302 may be any of a large number of display devices that are well known in the art. For example, video display 302 may be a cathode ray tube of a type that is used with many personal computers.

Figure 4:
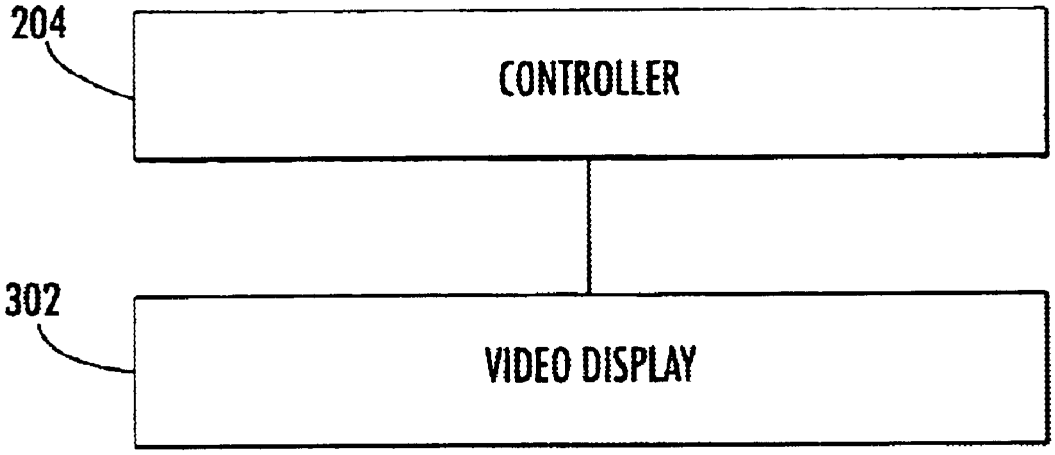
FIG. 4 is substantially a schematic diagram of the gaming device of FIG. 3.

Video display 302 is in communication with a controller or processor 204 as shown in FIG. 4. The controller 204 transmits messages to video display 202 to request the display to produce different displays. For example, controller 204 may send a signal to video display 202 to stop the image of the roulette wheel on number 8. The operation of gaming device 300 is the essentially the same as for gaming device 20. Video display 302 may comprise a video controller (not shown) that drives the display device to present various displays. Many different well-known video controllers may be used. Software and data used to produce different presentations may be stored on the video controller in non-volatile memory, such as compact disks, magnetic disk drives, or erasable programmable read only memory (EPROM). Video display 302 may display other information in graphic and text form, such as instructions on how to use the gaming device. Speakers may also be provided for presenting audio information, such as sound effects or music when a prize is won.

This embodiment has the advantage of reducing maintenance because the moving parts of a mechanical display are eliminated. This embodiment also provides greater flexibility because many different kinds of presentations may be displayed on the video display 302.

Flow Chart

Figure 5:
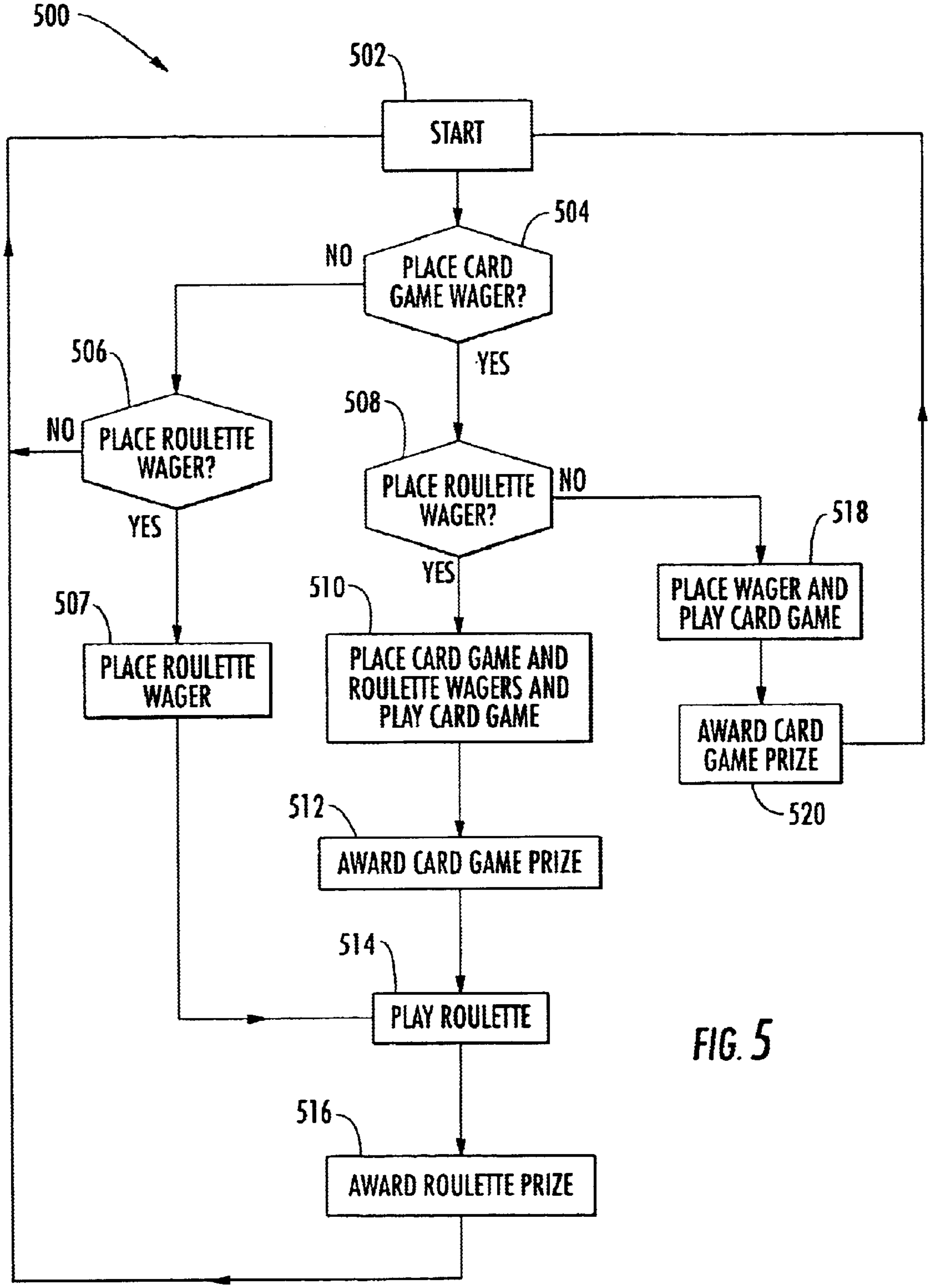
FIG. 5 is substantially a flow chart of the operation of the game of the present invention.

Turning now to FIG. 5, a flowchart 500 of the operation of the gaming device 20 of the present invention is shown. The method includes a starting step 502. A game player is allowed to decide if they would like to place a card game wager at step 502. If the player elects to place a card game wager, the game proceeds to decision step 508. If the player elects not to place a card game wager at step 504, the game proceeds to decision step 506 where the game player is allowed to decide if they would like to place a roulette game wager. If the players decision at step 506 is no, the game returns to starting step 502. If the players decision at step 506 is yes, the game proceeds to step 507 where the game player places a wager on roulette betting area 30. At step 514, the player plays roulette using wheel 40. Next, at step 516 the game player is awarded a roulette prize. A dealer in dealer position 22 would award the prize. The game then returns to step 502 to allow the player to play again.

If the players decision at step 504 is yes to place a card game wager, the game proceeds to step 508 where the game player is allowed to decide if they would like to place a roulette game wager. If the game player decides to wager on the roulette game, the game proceeds to step 510 where the game player places a wager on card betting area 24 and places a wager on roulette wagering area 30 and plays a card game. Next, at step 512 the game player is awarded a card game prize by the dealer. The game then proceeds to step 514 where the game player plays roulette using wheel 40. Next, at step 516 the game player is awarded a roulette prize by the dealer. The game then returns to step 502 to allow the player to play again.

If the game player decides not to wager on the roulette game at step 508, the game proceeds to step 518 where the game player places a wager on card betting area 24 and plays a card game. Next, the game proceeds to step 520 where a card game prize is awarded by the dealer. The game then returns to step 502 to start the game again.

The method of flowchart 500 provides a game player with an enjoyable gaming experience in which they are able to have several bets being played at one time.

One of the advantages of providing the game discussed above is to increase the excitement and enjoyment of playing the gaming device. Not only is the game entertaining to view, but it also increases the excitement and enjoyment experienced by players by offering the player additional bets during the course of the game.

Slot Machine Embodiment

Figure 6:
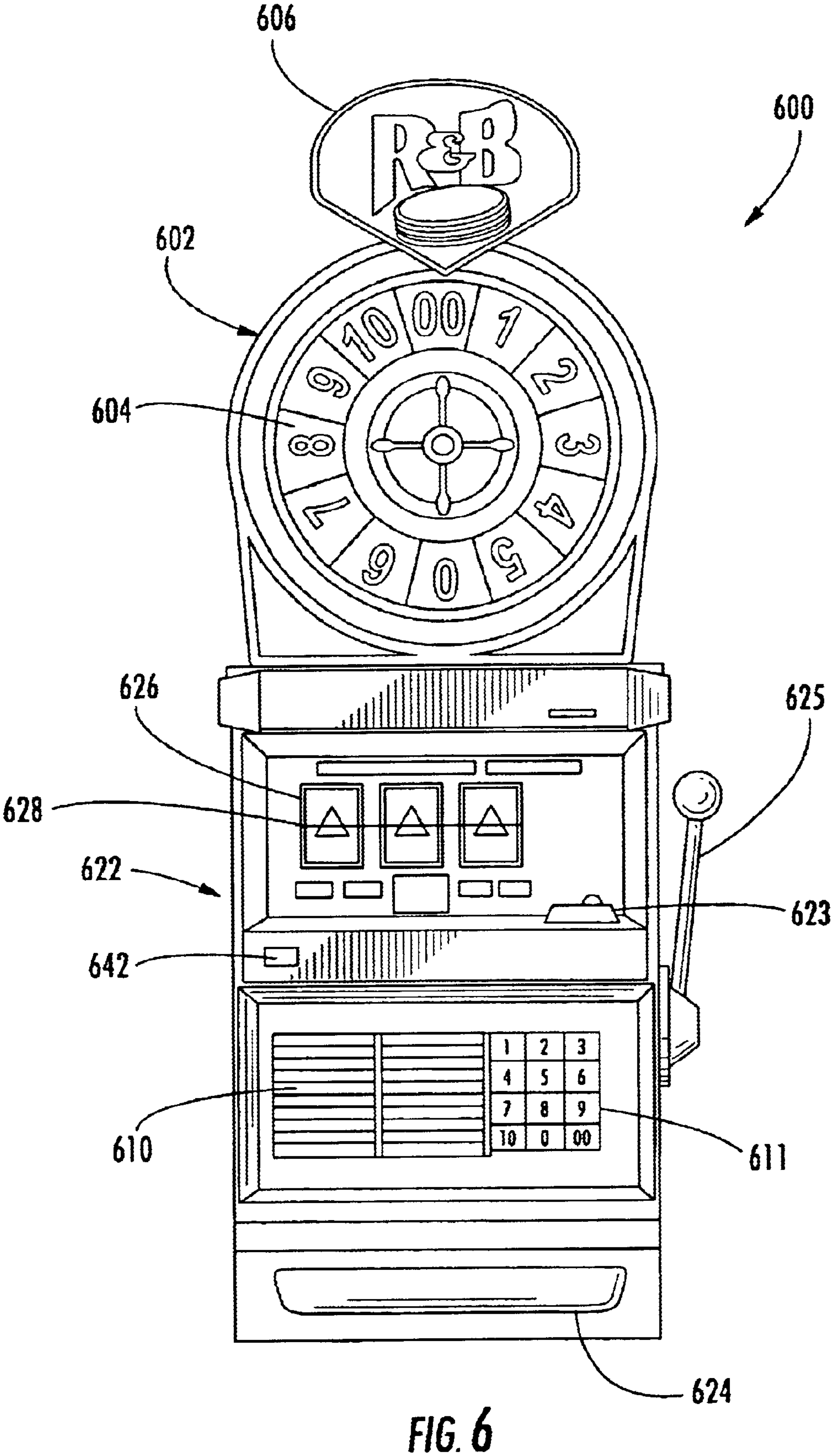
FIG. 6 is substantially a front perspective view of an alternative embodiment of the gaming device of the present invention used in conjunction with a slot machine.

Referring to FIG. 6, a gaming device 600 is shown. Gaming device 600 comprises a roulette wheel 602 mounted on top of a base game 622. Base game 622 can be almost any game. In FIG. 6, base game 622 is shown as a conventional slot machine. Base game 622 comprises several rotating reels 626 with a payline 628 that is actuated by a lever 625. One or more meters or displays 610 tell the game player their winnings and remaining playing credits. An input device 611 allows the game player to wager on a selected number on roulette wheel 602. Input device 611 can be a keypad or a touch screen video display. Base game 622 has a coin acceptor 623 for accepting wagers and a coin dispenser 624 for paying awards or prizes. Roulette wheel 602 is positioned so that it is visible to a game player. Roulette wheel 602 is circular in shape and is divided into 12 regions 604. Each region 604 contains indicia that correspond to the indicia on input device 611. A wheel pointer 606 is mounted to roulette wheel 602. Wheel pointer 606 indicates the winning roulette number after the roulette wheel has stopped spinning. Roulette wheel 606 is a conventional roulette wheel that is driven by a stepper motor as was described for gaming device 20.

It is noted that roulette wheel 602 is not a bonus game. A game player playing gaming device 600 can play the slot machine of the base game 622 or can play roulette on roulette wheel 602 or can play both at the same time. The player does not qualify to play roulette through their play on the slot machine. The play of the roulette game is completely independent of the play on the base game or slot machine. Roulette wheel 602 could also be implemented on a video display if desired. In this case input device 611 would be replaced by a second display screen that would be shown by the video display. The second display screen would allow selection of the desired roulette like bets and then would show the roulette wheel for game play.

During game play, a game player inserts coins, vouchers or credits into coin acceptor 623 in order to start the game. The game player has the option of either playing the base game slot machine or the roulette wheel or both. If the player chooses to only play the slot machine, the game player pulls lever 625 and only the slot machine is played. If the player only wishes to play roulette, the game player selects a roulette number to wager on using input device 611. Next, button 642 is depressed to start roulette wheel 602 spinning. The numbers on input device 611 correspond to the numbers on roulette wheel 602. The roulette wheel stops on a winning roulette number indicated by wheel pointer 606. Base game 610 then pays an award using coin dispenser 624, if the winning roulette number matches the wagered roulette number selected by the game player.

Keno Display Embodiment

Figure 7:
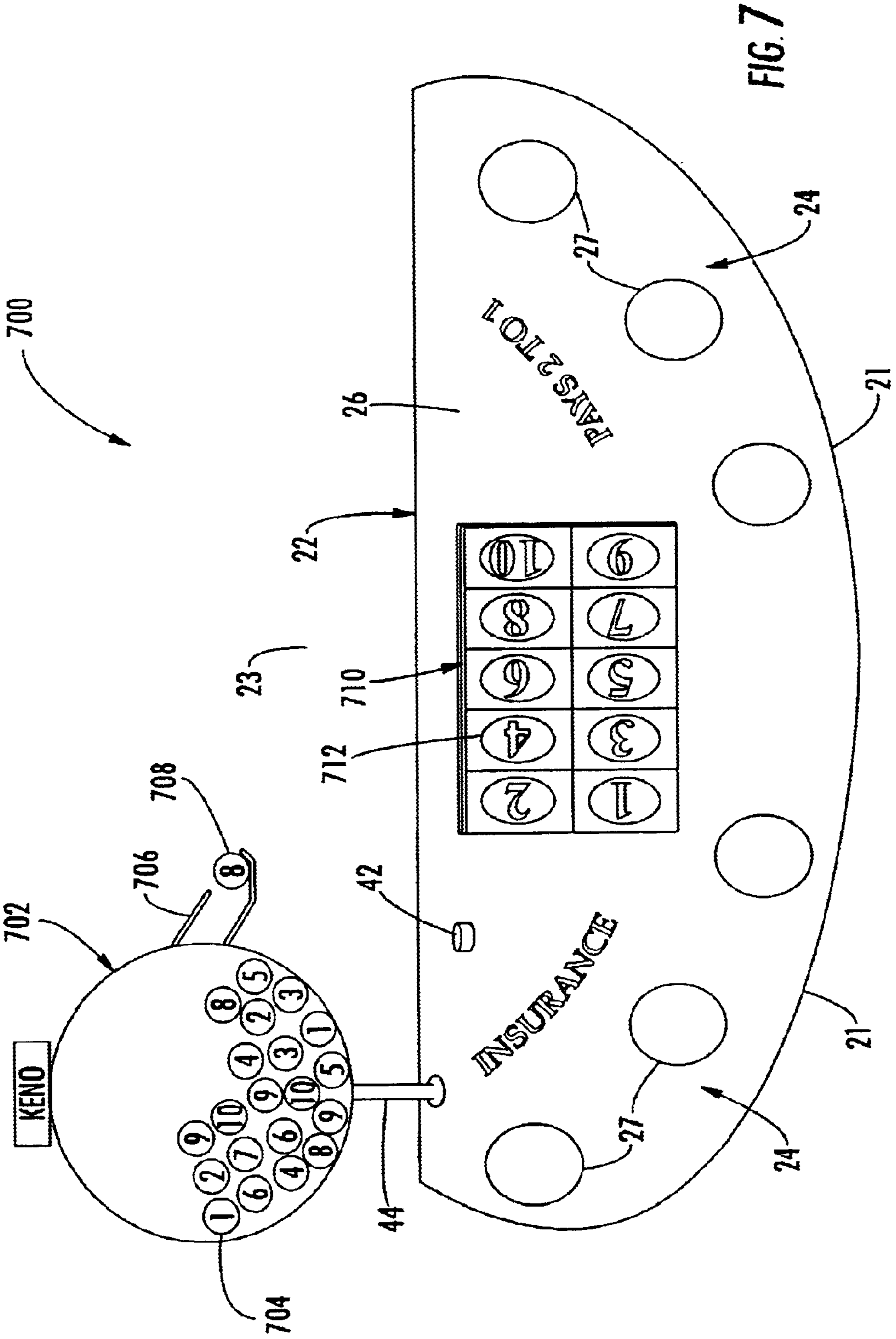
FIG. 7 is substantially a front perspective view of another embodiment of the present invention using a keno display.

Referring to FIG. 7, a gaming device 700 is shown. Gaming device 700 is similar to gaming device 20 except that roulette wheel 40 has been replaced by a keno display 702. Keno display 702 contains several keno display balls 704. Display 702 is preferably made from a clear material to allow a game player to view the balls. The keno display 702 is positioned so that it is visible to the game players in player positions 21. Display balls 704 have an applied number indicia. In the example shown, the numbers 1–10 are placed on the balls. Display balls 704 can be moved or jumbled in the display by a mechanical agitator by an air blower. A ball selection mechanism 706 is mounted to display 706. Ball selection mechanism 706 operates to either select one of the display balls 704 at random or can select and show another ball that is not obtained from display 702. The selected ball is a winning keno ball. Once a ball has been selected, it is displayed to the game player at ball display station 708. After the winning keno ball has been displayed, it can be returned to display 702.

A keno number wagering field 710 is located on table 22. Keno number wagering field 710 has several keno numbers 712 arranged on surface 26.

During game play, a game player would be seated in player position 21. A dealer in dealer position 23 deals cards for a conventional card game such as blackjack or poker. The game player has the option of playing the card game by placing a card game wager on card wagering area 24. In addition, the game player has the option of playing a keno game by placing a keno wager on keno number field 710 in the middle of table 22. The numbers of keno number field 710 correspond to the numbers on keno display balls 704. Those players desiring to play the card game are dealt a hand of cards and the card game is played to its normal conclusion. The dealer collects or pays the card game bets along with collecting the cards. After the card game is completed, the dealer pushes button 42 to start the display balls 704 moving. Ball selection mechanism 706 selects a winning keno ball and displays it at ball display station 708. The dealer then collects or pays the keno bets. The winning keno ball is returned to display 702. A new game may now be played.

The keno display 702 could also be mounted to the top of a conventional slot machine as a bonus game. This would add a keno bonus game to a slot machine.

CONCLUSION

It can now be seen that the present invention solves many of the problems associated with the prior art. The present invention provides a gaming device that may be used with well known games to increase a players enjoyment of the game. The present invention provides a game that allows a game player to place additional bets during a game so that if one game does not win there is an increased probability of another game winning. The present invention provides a gaming device for table games that provides multiple wagering opportunities. Although the description above contains many specifications, these should not be construed as limiting the scope of the invention but as merely providing illustrations of some of the presently preferred embodiments of this invention. Thus, the scope of the invention should be determined by the appended claims and their legal equivalents rather than by the examples given.

What is claimed is:

1. A game comprising:

(A) a table having a discrete card betting layout located on a surface of the table;

(B) a discrete roulette betting layout located on the surface of the table; and (C) a roulette wheel mounted to the table, wherein the card betting layout allows a game player to place a first wager and the roulette betting layout allows the game player to place a second wager.

2. The game according to claim 1, wherein the card betting layout is a blackjack card betting layout.

3. The game according to claim 1, wherein the card betting layout is a poker card betting layout.

4. The game according to claim 1, wherein the roulette wheel has an axis of rotation and the table has an upper surface, wherein the roulette wheel is positioned such that the axis of rotation is substantially parallel to the upper surface.

5. The game according to claim 1, wherein a wheel pointer is mounted to the roulette wheel, the wheel pointer indicating a winning roulette number.

6. The game according to claim 1, wherein the roulette wheel is driven by a stepper motor, the stepper motor being in communication with a processor, the processor adapted to randomly generate a winning roulette number.

7. The game according to claim 1, wherein the roulette wheel is mounted above the first gaming apparatus.

8. A table game comprising:

(A) a table;

(B) a card wagering area located on a surface of the table;

(C) a number field wagering area located on the surface of the table; and (D) a video display mounted to the table, the video display adapted to show an image of a roulette wheel.

9. The table game according to claim 8, wherein the card wagering area is a blackjack card wagering area.

10. The table game according to claim 8, wherein the card wagering area is a poker card wagering area.

11. The table game according to claim 8, wherein the card wagering area allows a game player to place a first wager and the number field wagering area allows the game player to place a second wager.

12. The table game according to claim 8, wherein the video display is mounted to a pole and the pole is mounted to the table, the video display being viewable by a game player.

13. The table game according to claim 8, wherein the video display is in communication with a processor, the processor adapted to display an image of a spinning roulette wheel on the video display and to display an image of a winning roulette number on the video display.

14. The table game according to claim 13, wherein a prize is awarded to the game player if the winning roulette number matches a number selected by the game player in the number field wagering area.

15. A gaming device comprising:

(A) a first gaming apparatus, the first gaming apparatus being adapted to accept a first wager and to award a first prize, the first gaming apparatus comprising a slot machine;

(B) a roulette wagering display mounted to the first gaming apparatus, the roulette wagering apparatus being adapted to allow a game player to place a roulette wager and to select a roulette number; and (C) a roulette wheel mounted to the first gaming apparatus, the roulette wheel adapted to generate a winning roulette number, the first gaming apparatus being adapted to award and display a prize when the selected roulette number matches the winning roulette number.

16. The gaming device according to claim 15, wherein the first wager and the roulette wager are independent.

17. A game comprising:

(A) a table having a card wagering area located on a surface of the table;

(B) a number field wagering area located on the surface of the card table; and (C) a keno ball display mounted to the table, the keno ball display having a plurality of keno balls therein, the keno ball display adapted to select and display a winning keno ball.

18. The game according to claim 17, wherein the card wagering area is a blackjack card wagering area.

19. The game according to claim 17, wherein the card wagering area is a poker wagering area.

20. The game according to claim 17, wherein the card wagering area allows a game player to place a first wager and the number field wagering area allows the game player to place a second wager.

21. The game according to claim 17, wherein the keno ball display is mounted to a pole and the pole is mounted to the table.

22. The game according to claim 21, wherein the winning keno ball appears to be selected from the plurality of keno balls.

23. The game according to claim 17, the keno balls have a number indicia thereon and the number field wagering area has a plurality of number positions each having an indicia, a prize being awarded when the keno ball number indicia matches the number position indicia.

24. A game comprising:

(A) a table having a card betting layout located on a surface of the table;

(B) a keypad located on the surface of the card table; and (C) a roulette wheel mounted to the card table.

25. The game according to claim 24, wherein the card betting layout is a blackjack card betting layout.

26. The game according to claim 24, wherein the card betting layout is a poker card betting layout.

27. The game according to claim 24, wherein the card betting layout allows a game player to place a first wager and the keypad allows the game player to place a second wager.

28. The game according to claim 24, wherein the keypad has a plurality of selector buttons.

* * * * *